United States Patent [19]
Kouta

[11] Patent Number: 5,251,059
[45] Date of Patent: Oct. 5, 1993

[54] FREQUENCY CONVERSION DEVICE AND METHOD OF FABRICATING THE SAME

[75] Inventor: Hikaru Kouta, Tokyo, Japan

[73] Assignee: Nec Corporation, Tokyo, Japan

[21] Appl. No.: 813,846

[22] Filed: Dec. 27, 1991

[30] Foreign Application Priority Data

Jan. 9, 1991 [JP] Japan .................................. 3-11664

[51] Int. Cl.⁵ ........................... H01S 3/10; H03F 7/00
[52] U.S. Cl. .................... 359/326; 359/328; 372/21; 372/22
[58] Field of Search ............... 359/326, 328, 332, 329, 359/330; 372/21, 22, 7, 39, 40, 41; 385/122

[56] References Cited

U.S. PATENT DOCUMENTS

| | | | |
|---|---|---|---|
| 4,390,991 | 6/1983 | Pearson | 372/21 |
| 4,913,533 | 4/1990 | Kafka et al. | 372/22 |
| 5,047,668 | 9/1991 | Bosenberg | 372/21 X |
| 5,048,029 | 9/1991 | Skupsky et al. | 372/26 |
| 5,130,844 | 7/1992 | Okazaki | 385/122 X |
| 5,136,597 | 8/1992 | Nightingale | 372/22 X |
| 5,138,686 | 8/1992 | Chikuma et al. | 385/122 |
| 5,144,630 | 9/1992 | Lin | 372/22 |
| 5,151,817 | 9/1992 | Krol et al. | 359/328 |
| 5,173,799 | 12/1992 | Tanuma | 372/22 X |
| 5,195,159 | 3/1993 | Uenishi et al. | 385/122 |

OTHER PUBLICATIONS

"Applied Nonlinear Optics", by F. Zernike et al., John Wiley and Sons, cover page, page stating UMI Out-of-Print Books on Demand and pp. 59–61 (1989).

"The Principles of Nonlinear Optics", by Y. R. Shen, John Wiley and Sons, cover page and pp. 72 and 76 (1962).

*Primary Examiner*—Brian Healy
*Attorney, Agent, or Firm*—Burns, Doane, Swecker & Mathis

[57] ABSTRACT

Disclosed is a frequency conversion device fabricated in a phase matching angle in which laser damage scarcely occurs, in order to increase the damage threshold value of the device, thus providing a greater harmonic output than a conventional device. This device also has an improved reliability. The angle where the laser damage threshold value is large is measured with light permitted to enter along X, Y and Z axes of the crystal in vertical and horizontal polarization, so that the frequency conversion device can be fabricated in the phase matching angle in which the laser threshold value becomes maximum.

10 Claims, No Drawings

FREQUENCY CONVERSION DEVICE AND METHOD OF FABRICATING THE SAME

BACKGROUND OF THE INVENTION

1. Field of the Invention

The present invention relates to a method of fabricating a frequency conversion device using a nonlinear optical material and to such a frequency conversion device.

2. Description of the Related Art

A nonlinear optical material has an inherent nonlinear optical constant (hereafter referred to as "d constant"). To make a frequency conversion device of this material using a critical phase matching method, the phase matching angle should be so selected that the d constant becomes maximum.

There is an increasing need for a high power laser as a light source which performs frequency conversion using a nonlinear optical material in order to acquire a second harmonic of a high output. Since frequency conversion devices are used in the vicinity of a laser-induced damage threshold value, a greater threshold value is desirable. Also there are demands for improvement of the harmonic output to be acquired, and improvement of the reliability of the frequency conversion devices to a high power laser.

SUMMARY OF THE INVENTION

It is an object of the present invention to provide a method of fabricating a frequency conversion device using a nonlinear optical material which comprises a step of fabricating the frequency conversion device in a phase matching angle where the nonlinear optical material has a maximum laser damage threshold value.

A frequency conversion device fabricated from a single crystal of lithium borate (LiB$_3$O$_5$, hereafter referred to as "LBO") by this method provides a second harmonic of light of 1.064 μm generated from a YAG laser, and is characterized by having a phase matching angle of $\theta=55°$ and $\phi=28°$, where a laser damage threshold value becomes maximum by a phase matching method of Type I. Another frequency conversion device fabricated from a single crystal of β-barium borate (β-BaB$_2$O$_4$, hereafter referred to as BBO) by the above method provides a second harmonic of an incident laser beam, and is characterized by having a phase matching angle of $\phi=30°$, where a laser damage threshold value becomes maximum by a critical phase matching method of Type I.

In the method of fabricating a frequency conversion device by phase matching according to the present invention, the device is fabricated in a phase matching angle in which a laser damage threshold value becomes maximum. Laser beams having a high output can therefore enter in this angle rather than in the angle that makes the d constant maximum. If the rate of increasing the intensity of the laser which can enter without damage is greater than the rate of reducing the d constant, the efficiency of wave conversion from incident laser to the second harmonic becomes greater. This yields a harmonic with a larger output than the prior art can provide. Further, the allowable range of the intensity of the incident laser beam until the occurrence of damage also becomes broader, thus enhancing the reliability of the frequency conversion device when used with the laser beam whose intensity is equal to or below the damage threshold value.

In the case where a generator for generating the second harmonic of the YAG laser of 1.064 μm is fabricated from an LBO single crystal, the phase matching angle of Type I, $\theta=90°$ and $\phi=11°$, has conventionally been used, in which the d constant becomes maximum. A frequency conversion device fabricated in a phase matching angle of $\theta=55°$ and $\phi=28°$ however has a laser damage threshold value approximately one and half times greater than the conventional value. This device can therefore receive laser beams with higher energy than the conventional device, thus providing a second harmonic with higher output. The reliability of the frequency conversion device is also improved with respect to a high power incident laser beam.

In the case of fabricating the second harmonic generator in the phase matching angle of Type I from the BBO single crystal, conventionally, $\phi$ is fixed to 0° and $\theta$ is changed according to the frequency to adjust the phase matching angle. The laser damage threshold value is however larger when $\theta$ is changed with $\phi$ fixed to 30°. A frequency conversion device with $\phi=30°$ can receive laser beams of higher output than the conventional device, thus providing a higher second harmonic. The reliability of this device increases with respect to a high power incident laser beam.

(1) The results of experiments conducted using BBO and LBO showed that the crystal structure is anisotropic, and so is the laser damage value accordingly. A critical phase matching is usually performed in an angle at which the d constant is large. If a frequency conversion device is fabricated in a phase matching angle where its material can have a large laser damage threshold value, the device can receive a laser beam with greater energy than the conventional device. The acquired harmonic output becomes greater accordingly. With the use of a high-power laser, a more durable frequency conversion device is provided if the crystal should be used for the frequency conversion device in the angle in which the laser damage threshold value is greater, even out of an extreme usage. This fabrication method can be applied to other crystals than LBO and BBO as long as they have an anisotropic structure to thereby ensure an anisotropic laser damage threshold value.

(2) The phase matching angle of LBO with respect to light of 1.064 μm is usually set to $\theta=90°$ and $\phi=11°$ in which the d constant is maximum by the phase matching method of Type I. A laser damage threshold value is however larger in an angle of $\theta=55°$ and $\phi=28°$ than in the former angle. The rate of increasing the laser damage threshold value is greater than the rate of decreasing the d constant. The former case therefore provides a second harmonic of a larger output when the frequency conversion device is in an extreme use. The greater the laser damage threshold value is, the higher the reliability of the frequency conversion device becomes.

(3) With BBO serving as a SHG device, $\phi$ is usually fixed to 0° and $\theta$ is adjusted according to the frequency of incident light to determine the phase matching angle. Though $\theta$ is dependent on the frequency of the incident light, phase matching can also be accomplished by changing $\phi$. When $\phi$ is changed to 30°, the angle becomes such that the laser damage threshold value is large. The relationship between the laser damage threshold value and the d constant thus meets the same requirements as in (2). In this angle, the frequency conversion device can provide a second harmonic of greater output, thereby increasing the reliability of the device.

DETAILED DESCRIPTION OF THE PREFERRED EMBODIMENTS

Preferred embodiments of the present invention will now be described.

FIRST EMBODIMENT

With the use of an XYZ-cut LBO single crystal, the laser damage threshold value was measured by changing the incident direction and polarizing direction of light. When the light entered or was polarized in the direction of the Z axis, the threshold value was smaller than in the other cases. In other words, the laser damage threshold value was large when the incident laser light had a smaller magnitude of a progressing vector component or polarizing-directional component along the Z axis. The laser damage threshold value was also measured using LBO prepared in the conventional phase matching angle ($\theta=90°$, $\phi=11°$) of a device of generating a second harmonic of 1.064 μm light emanated from a YAG laser, and LBO prepared in a phase matching angle ($\theta=55°$, $\phi=28°$) in which there is a smaller magnitude of a polarizing component along the Z axis. In the former case of using the LBO, the threshold value was 172 GW/cm$^2$, while the latter case had a threshold value of 277 GW/cm$^2$. The efficiency of frequency conversion from an incident laser beam to a second harmonic was proportional to the second power of the d constant or the second power of the intensity of the incident laser beam. The d constant was represented as deff ($\theta=55°$, $\phi=28°$)=0.72 deff ($\theta=90°$, $\phi=11°$), while the damage threshold value (G) was expressed by G ($\theta=55°$, $\phi=28°$)=1.6 G ($\theta=90°$, $\phi=11°$). The rate of increasing the threshold value was greater than that of reducing the d constant. When the frequency conversion device is used at the maximum laser damage threshold value, therefore, the device fabricated in an angle of $\theta=55°$ and $\phi=28°$ can receive a stronger laser beam. The intensity of the acquired second harmonics is accordingly great. If the device performs frequency conversion of the high power laser beam even out of an extreme usage, the device fabricated in the angle that ensures a large damage threshold value would have an improved reliability.

SECOND EMBODIMENT

BBO, a trigonal crystal, has three equivalent a axes. The laser damage threshold value of BBO was measured for a laser beam incident along the c axis. The results were such that the threshold value became smaller for the laser beam polarized in the direction of the a axis, and was large for the light incident in a direction inclined by 30° from the a axis. The second harmonic generating device is generally fabricated using BBO with $\phi$ fixed to 0° and $\theta$ set adjustable. The threshold value will however increase if the device is fabricated with $\phi$ fixed to 30°. Threshold values of a SHG device fabricated in the ordinary angle ($\theta=23°$, $\phi=0°$) and a device fabricated in an angle of $\theta=23°$ and $\phi=30°$ were measured with respect to light of 1.06 μm generated from a YAG laser. The threshold value of the former device was 19 GW/cm$^2$, and that of the latter device 28.5 GW/cm$^2$. The d constant was deff ($\phi=30°$)=0.7 deff ($\phi=0°$) by the phase matching method of Type I, while the threshold value was G ($\phi=30°$)=1.5 G ($\phi=0°$). With the frequency conversion device in an extreme use, therefore, because of the same reasons as given in the description of the first embodiment, a second harmonic of higher output can be attained if this device is fabricated with $\phi=30°$, and the reliability of the device as a second harmonic generating device will be improved even out of an extreme usage.

According to the present invention, when a nonlinear optical device is used to an extreme or as a frequency conversion device for the high power laser, the output of a harmonic to be acquired increases, and so does the reliability of the device.

What is claimed is:

1. A frequency conversion device for providing a second harmonic of light of 1.064 μm generated from a YAG laser, comprising: a single crystal of lithium borate (LiB$_3$O$_5$), having a phase matching angle of $\theta=55°$ and $\phi=28°$, in which a laser damage threshold value becomes maximum.

2. A frequency conversion device for providing a second harmonic of an incident laser beam, comprising: a single crystal of $\beta$-barium borate ($\beta$-BaB$_2$O$_4$), having a phase matching angle of $\phi=30°$, in which a laser damage threshold value becomes maximum.

3. A frequency conversion device according to claim 1, wherein said laser damage threshold value becomes maximum by phase matching.

4. The frequency conversion device according to claim 1, wherein said laser damage threshold value becomes maximum by a phase matching method of Type I.

5. A frequency conversion device according to claim 4, wherein said laser damage threshold value is an anisotropic laser damage threshold value.

6. The frequency conversion device according to claim 1, wherein said laser damage threshold value is an anisotropic laser damage threshold value.

7. The frequency conversion device according to claim 2, wherein said laser damage threshold value becomes maximum by phase matching.

8. The frequency conversion device according to claim 2, wherein said laser damage threshold value becomes maximum by a critical phase matching method of Type I.

9. The frequency conversion device according to claim 8, wherein said laser damage threshold value is an anisotropic laser damage threshold value.

10. The frequency conversion device according to claim 2, wherein said laser damage threshold value is an anisotropic laser damage threshold value.

* * * * *